United States Patent
Kotzer et al.

(10) Patent No.: US 10,038,464 B2
(45) Date of Patent: Jul. 31, 2018

(54) CONFIGURABLE COMMUNICATIONS MODULE

(71) Applicant: GM GLOBAL TECHNOLOGY OPERATIONS LLC, Detroit, MI (US)

(72) Inventors: Igal Kotzer, Tel-Aviv (IL); Eilon Riess, Zikron-Yaakov (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/241,358

(22) Filed: Aug. 19, 2016

(65) Prior Publication Data

US 2017/0070253 A1 Mar. 9, 2017

Related U.S. Application Data

(60) Provisional application No. 62/207,866, filed on Aug. 20, 2015, provisional application No. 62/207,872, filed on Aug. 20, 2015, provisional application No. 62/207,876, filed on Aug. 20, 2015.

(51) Int. Cl.
*H04B 1/38* (2015.01)
*H04B 1/3816* (2015.01)
*H04Q 9/02* (2006.01)
*H04B 1/3822* (2015.01)

(52) U.S. Cl.
CPC ......... *H04B 1/3816* (2013.01); *H04B 1/3822* (2013.01); *H04Q 9/02* (2013.01)

(58) Field of Classification Search
CPC ....... H04B 1/38; H04B 1/3816; H04B 1/3822
USPC ................................................ 455/558, 90.3
See application file for complete search history.

(56) References Cited

U.S. PATENT DOCUMENTS

| | | | | |
|---|---|---|---|---|
| 5,113,500 A * | 5/1992 | Talbott | ................. | G06F 13/105 710/303 |
| 6,147,863 A * | 11/2000 | Moore | .................... | G06F 1/184 361/679.6 |
| 6,243,578 B1 * | 6/2001 | Koike | ...................... | H04B 1/38 455/552.1 |
| 6,331,886 B2 * | 12/2001 | Nagano | .................. | G03B 27/52 353/26 R |
| 6,400,578 B1 * | 6/2002 | Chen | .................... | G11B 33/125 361/679.37 |
| 6,823,283 B2 * | 11/2004 | Steger | .................... | G16H 40/40 702/127 |
| 7,024,660 B2 * | 4/2006 | Andrade | ............... | G06F 11/263 714/25 |
| 7,085,670 B2 * | 8/2006 | Odom | ................... | G06F 9/4411 702/127 |
| 7,149,549 B1 * | 12/2006 | Ortiz | ...................... | H04N 5/232 455/566 |
| 7,165,005 B2 * | 1/2007 | Steger | .................... | H04L 43/14 702/120 |

(Continued)

*Primary Examiner* — April G Gonzales
(74) *Attorney, Agent, or Firm* — Reising Ethington, P.C.

(57) ABSTRACT

A system for providing telematics includes a communications module having a host portion in communication with at least one communications cartridge, wherein the at least one communications cartridge includes an adapter board having a cradle for receiving a communications card, wherein the cradle includes an interface for removably coupling the communications card to the adapter board, and wherein the adapter board is configured to communicatively couple the communications card and the host portion of the communications module.

20 Claims, 4 Drawing Sheets

(56) References Cited

U.S. PATENT DOCUMENTS

| | | | | |
|---|---|---|---|---|
| 7,254,512 B2* | 8/2007 | Odom | G16H 40/63 | 702/127 |
| 7,347,780 B1* | 3/2008 | Best | A63F 13/10 | 463/1 |
| 7,478,006 B2* | 1/2009 | Odom | G01D 9/005 | 702/127 |
| 7,509,445 B2* | 3/2009 | Odom | G01D 9/005 | 710/313 |
| 7,686,654 B2* | 3/2010 | Hubert | H05K 5/0265 | 361/737 |
| 7,699,660 B2* | 4/2010 | Hubert | G06F 13/409 | 439/630 |
| 7,780,477 B2* | 8/2010 | Hubert | G06K 19/07741 | 439/630 |
| 7,817,989 B2* | 10/2010 | Silverbrook | H04N 1/00968 | 455/414.1 |
| 7,907,968 B2* | 3/2011 | Silverbrook | G06K 19/06037 | 455/414.1 |
| 8,051,229 B2* | 11/2011 | Hubert | G06F 13/409 | 710/74 |
| 8,121,642 B2* | 2/2012 | James | H04W 4/02 | 455/418 |
| 8,484,284 B2* | 7/2013 | Elliott | A63F 13/12 | 709/203 |
| 9,374,552 B2* | 6/2016 | Taraki | H04N 5/76 | |
| 2003/0201322 A1* | 10/2003 | Wu | G06K 7/0047 | 235/441 |

* cited by examiner

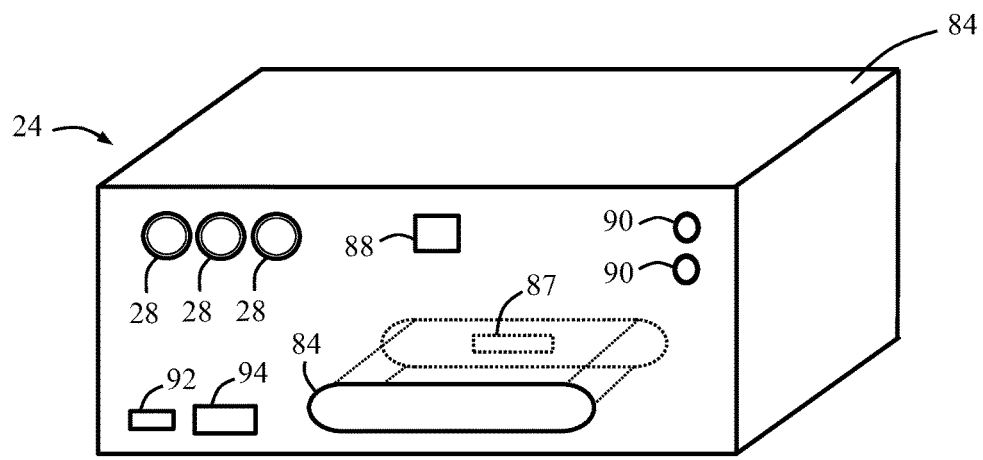
*FIGURE 2A*
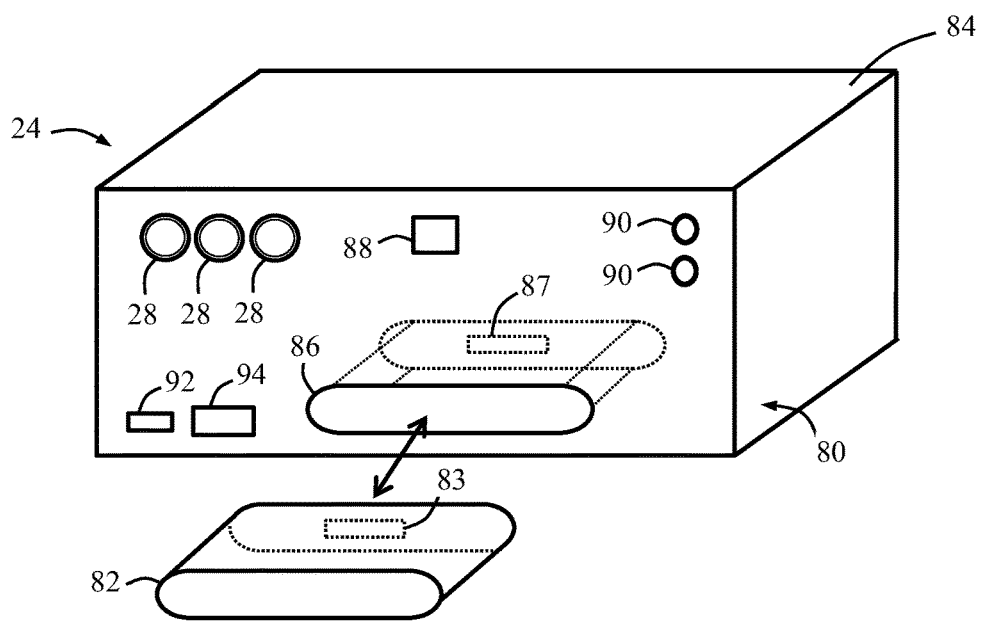
*FIGURE 2B*
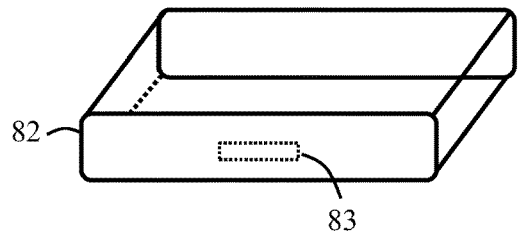

CONFIGURABLE COMMUNICATIONS MODULE

TECHNICAL FIELD

The present invention relates to vehicle communications, and in particular, to enhancing vehicle communication capabilities by providing a configurable communications module.

BACKGROUND

Telematics units are now widely in use on vehicles to provide drivers and passengers with various types of wireless assistance services. For example, roadside assistance, which historically involved a disabled vehicle and a physical visit to the vehicle by a serviceman, can now in many instances be provided remotely via wireless telecommunication with the vehicle through existing cellular network facilities. Thus, a telephone call to a call center can be used to electronically unlock doors where the keys have inadvertently been locked inside. Also, navigation and emergency assistance services can be obtained by voice communication with an advisor at the call center. Monitoring of vehicle operating conditions by the call center is also possible via the telematics unit. For example, an air bag deployment event can be automatically reported to the call center where it triggers a return call to the vehicle from a live advisor to determine if emergency services are needed. However, the services and capabilities of the telematics unit are characteristically limited to the technology and capabilities that exist at the time of design. Aside from software updates that address functionality and limited hardware adjustments, the traditional telematics unit is not upgradeable. Consequently, the telematics unit becomes outdated and incompatible with emerging wireless and cellular technologies.

SUMMARY

According to an embodiment of the invention, there is provided a system for providing telematics that includes a communications module having a host portion in communication with at least one communications cartridge, wherein the at least one communications cartridge includes an adapter board having a cradle for receiving a communications card, wherein the cradle includes an interface for removably coupling the communications card to the adapter board, and wherein the adapter board is configured to communicatively couple the communications card and the host portion of the communications module.

According to an embodiment of the invention, there is provided a system for providing telematics that includes a modular communications unit having a host portion in communication with at least one communications cartridge having a removable communications card, wherein the host portion is communicatively coupled to the communications card through the at least one communications cartridge and wherein the host portion is configured to detect information relating to the removable communications card and to access configuration information relating to the removable communications card from the at least one communications cartridge.

BRIEF DESCRIPTION OF THE DRAWINGS

One or more embodiments of the invention will hereinafter be described in conjunction with the appended drawings, wherein like designations denote like elements, and wherein:

FIGS. 2A and 2B illustrate an exemplary embodiment of a configurable communications module according to one embodiment of the present invention;

DETAILED DESCRIPTION OF THE ILLUSTRATED EMBODIMENT(S)

The system and method described below pertain to a modular and configurable vehicle communications module having a host with one or more insertion slots configured to receive a communications cartridge. The communications cartridge contains a removable and replaceable communications card. The communications cartridge includes an adapter board having a standard interface between the host hardware and the hardware of the communications card, which enables plug-and-play functionality. Through the connections on the adapter board, the host is able to implement software and driver updates when a new communications card is inserted into the communications cartridge. In one embodiment, the host is also able to identify the type of communications card in the communications cartridge.

In one embodiment, the host and the communications cartridge are communicatively connected through an extension cable. The extension cable extends from the communications cartridge to the host via a connector on the host that includes data and RF connection points.

Communications System—

The following detailed description is merely exemplary in nature and is not intended to limit the application and uses. Furthermore, there is no intention to be bound by any expressed or implied theory presented in the preceding technical field, background, brief summary or the following detailed description.

Referring to the Figures, wherein like numerals indicate like parts throughout the several views, there is shown an operating environment that comprises a mobile vehicle communications system 10 and that can be used to implement the method disclosed herein. While the approach and methodology described below relate to vehicle communications, one of ordinary skill in the art appreciates that an automotive application is merely exemplary, and that the concepts disclosed herein may also be applied to any other suitable communications system, but more specifically, non-vehicle applications. The term vehicle as described herein is also to be construed broadly to include not only a passenger car, but any other vehicle including, but not limited to, motorcycles, trucks, sports utility vehicles (SUVs), recreational vehicles (RVs), marine vessels, and aircraft.

Figure 1:
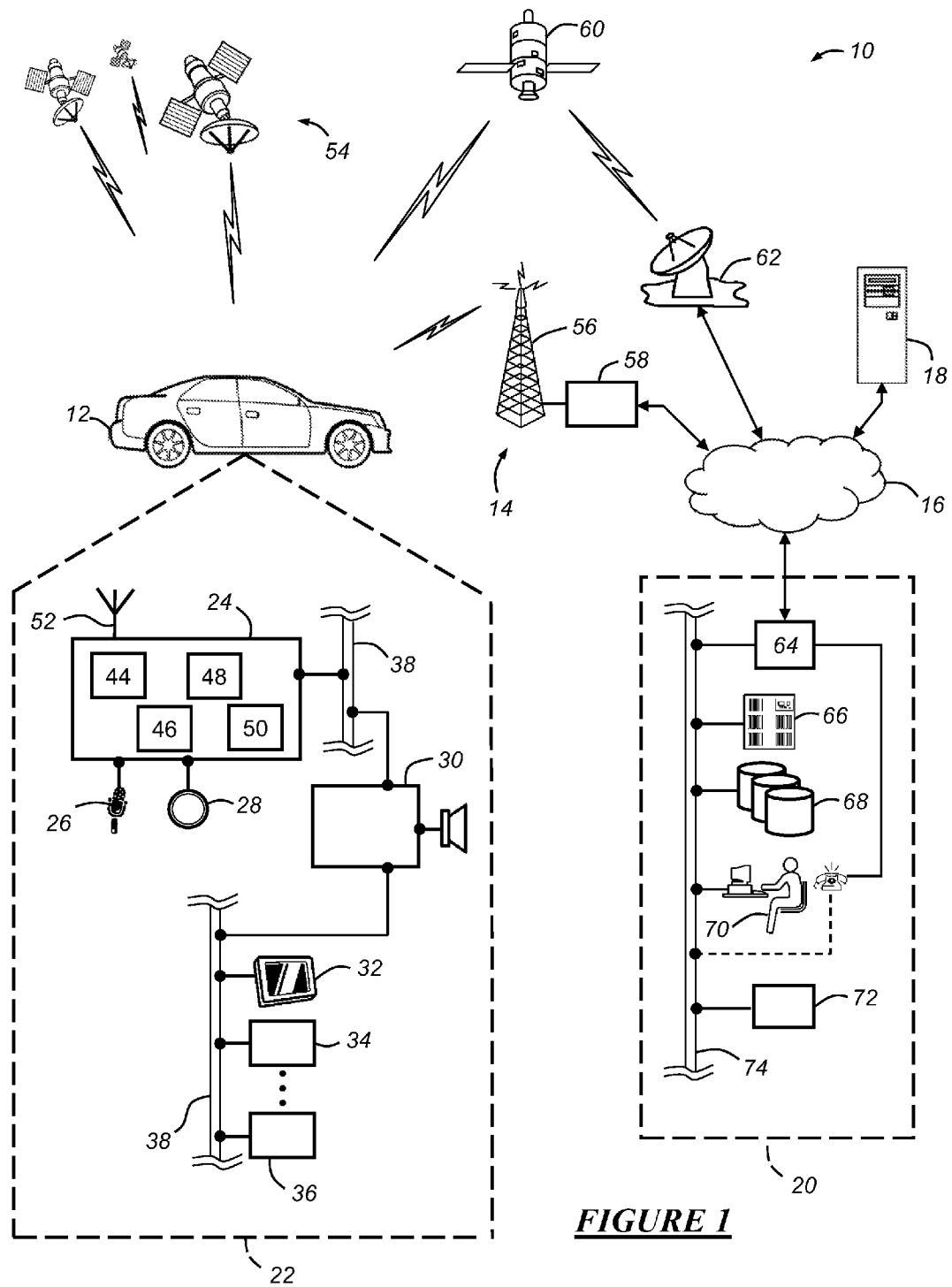
FIG. 1 is a block diagram depicting an embodiment of a communications system that is capable of utilizing the system and method disclosed herein.

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 includes vehicle hardware 22 having a configurable communications module (CCM) 24, a microphone 26, one or more pushbuttons or other control inputs 28, an audio system 30, and a visual display 32, a GPS module 34, as well as a number of vehicle system modules (VSMs) 36. Some of these devices can be connected directly to the CCM 24 such as, for example, the microphone 26 and pushbutton(s) 28, whereas others are indirectly connected using one or more network connections, such as a vehicle communications bus or an entertainment bus 38. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

CCM 24 is itself a vehicle system module (VSM) and can be an OEM-installed (embedded) or aftermarket device that is installed in the vehicle. In one embodiment, CCM 24 is a telematics device that enables a variety of telematics including wireless voice and/or data communication over wireless carrier system 14 and via wireless networking. Telematics, as used herein, refers broadly to a range of telecommunications and information processing. As such, telematics may encompass technologies relating to, for example, telecommunications, vehicular technologies, road transportation, road safety, sensors, instrumentation, wireless communications, multimedia, Internet, to name a few. In the vehicular embodiment shown in FIG. 1, CCM 24 enables the vehicle to communicate with call center 20, other telematics-enabled vehicles, or some other entity or device. CCM 24 preferably uses radio transmissions to establish a communications channel (a voice channel and/or a data channel) with wireless carrier system 14 so that voice and/or data transmissions can be sent and received over the channel. By providing both voice and data communication, CCM 24 enables the vehicle to offer a number of different services including those related to navigation, telephony, emergency assistance, diagnostics, infotainment, etc. For example, an infotainment module may provide for managing and playing audio content, utilizing navigation for driving, delivering rear-seat entertainment such as movies, games, social networking, listening to incoming and sending outgoing SMS text messages, making phone calls, and accessing Internet-enabled or smartphone-enabled content such as traffic conditions, sports scores, and weather forecasts. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, CCM 24 utilizes cellular communication according to GSM, CDMA, or LTE standards, etc. and thus includes a standard cellular chipset 44 for voice communications like hands-free calling, a wireless modem 46 for data transmission, an electronic processing device or processor 48, one or more digital memory devices 50 including volatile and non-volatile memory, and a dual antenna 52. It should be appreciated that the modem 46 can either be implemented through software that is stored in the CCM 24 and is executed by processor 38, or it can be a separate hardware component located internal or external to CCM 24. Furthermore, one or more of the cellular chipset 44, wireless modem 46, processor 48, and memory devices 50 may be collectively embodied in the form of software and/or hardware in a device that is physically separable from a main or host portion of the CCM 24. The modem can operate using any number of different standards or protocols such as LTE, EVDO, CDMA, GPRS, and EDGE. Wireless networking between the vehicle and other networked devices can also be carried out using CCM 24. For this purpose, CCM 24 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit can be configured with a static IP address or can set up to automatically receive an assigned IP address from another device on the network such as a router or from a network address server.

The processing device 48 in CCM 24 can be any type of device capable of processing electronic instructions including microprocessors, microcontrollers, host processors, controllers, vehicle communication processors, and application specific integrated circuits (ASICs). It can be a dedicated processor used only for CCM 24 or can be shared with other vehicle systems. The processing device executes various types of digitally-stored instructions, such as software or firmware programs stored in the memory, which enable the CCM 24 to provide a wide variety of services. For instance, the processing device can execute programs or process data to carry out at least a part of the method discussed herein.

CCM 24 can be used to provide a diverse range of vehicle services that involve wireless communication to and/or from the vehicle. Such services include: turn-by-turn directions and other navigation-related services that are provided in conjunction with the GPS-based vehicle navigation module 34; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of CCM 24, but are simply an enumeration of some of the services that the CCM 24 is capable of offering. Furthermore, it should be understood that at least some of the aforementioned modules could be implemented in the form of software instructions saved internal or external to CCM 24, they could be hardware components located internal or external to CCM 24, or they could be integrated and/or shared with each other or with other systems located throughout the vehicle, to cite but a few possibilities. In the event that the modules are implemented as VSMs 36 located external to CCM 24, they could utilize vehicle bus 38 to exchange data and commands with the telematics unit.

GPS module 34 receives radio signals from a constellation 54 of GPS satellites. From these signals, the module 34 can determine vehicle position that is used for providing navigation and other position-related services to the vehicle driver. Navigation information can be presented on the display 32 (or other display within the vehicle) or can be presented verbally such as is done when supplying turn-by-turn navigation. The navigation services can be provided using a dedicated in-vehicle navigation module (which can be part of GPS module 34), or some or all navigation services can be done via CCM 24, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 34 from the call center 20 via the CCM 24.

Apart from the audio system 30 and GPS module 34, the vehicle 12 can include other vehicle system modules (VSMs) 36 in the form of electronic hardware components that are located throughout the vehicle and typically receive input from one or more sensors and use the sensed input to perform diagnostic, monitoring, control, reporting and/or other functions. Each of the VSMs 36 is preferably connected by communications bus 38 to the other VSMs, as well as to the CCM 24, and can be programmed to run vehicle system and subsystem diagnostic tests. As examples, one VSM 36 can be an engine control module (ECM) that controls various aspects of engine operation such as fuel ignition and ignition timing, another VSM 36 can be a powertrain control module that regulates operation of one or more components of the vehicle powertrain, and another VSM 36 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

In some embodiments, the VSMs may include a processor and memory (not shown). The processor can be any type of device capable of processing electronic instructions including microprocessors, microcontrollers, host processors, controllers, vehicle communication processors, and application specific integrated circuits (ASICs). The processor may execute various types of digitally-stored instructions, such as software or firmware programs stored in the memory, which enable the processor to execute programs or process data to carry out at least a part of the method discussed herein. The memory may include non-transitory computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes.

Vehicle electronics 22 also includes a number of vehicle user interfaces that provide vehicle occupants with a means of providing and/or receiving information, including microphone 26, pushbuttons(s) 28, audio system 30, and visual display 32. As used herein, the term 'vehicle user interface' broadly includes any suitable form of electronic device, including both hardware and software components, which is located on the vehicle and enables a vehicle user to communicate with or through a component of the vehicle. Microphone 26 provides audio input to the CCM 24 to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 28 allow manual user input into the CCM 24 to initiate wireless telephone calls and provide other data, response, or control input. Separate pushbuttons can be used for initiating emergency calls versus regular service assistance calls to the call center 20. Audio system 30 provides audio output to a vehicle occupant and can be a dedicated, stand-alone system or part of the primary vehicle audio system. According to the particular embodiment shown here, audio system 36 is operatively coupled to both vehicle bus 38 and/or an entertainment bus and can provide AM, FM and satellite radio, CD, DVD and other multimedia functionality. This functionality can be provided in conjunction with or independent of the infotainment module described above. Visual display 32 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 56 (only one shown), one or more mobile switching centers (MSCs) 58, as well as any other networking components required to connect wireless carrier system 14 with land network 16. Each cell tower 56 includes sending and receiving antennas and a base station, with the base stations from different cell towers being connected to the MSC 58 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 60 and an uplink transmitting station 62. Uni-directional communication can be, for example, satellite radio services, wherein programming content (news, music, etc.) is received by transmitting station 62, packaged for upload, and then sent to the satellite 60, which broadcasts the programming to subscribers. Bi-directional communication can be, for example, satellite telephony services using satellite 60 to relay telephone communications between the vehicle 12 and station 62. If used, this satellite telephony can be utilized either in addition to or in lieu of wireless carrier system 14.

Communications network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14. The Internet infrastructure in network 16 is a global infrastructure of interconnected computer networks to link billions of devices worldwide. The Internet is an international network of networks that consists of millions of private, public, academic, business, and government packet switched networks linked by a broad array of electronic, wireless, and optical networking technologies. These computer networks are accessible through the vehicle 12 via CCM 24 and wireless carrier system 14 and include, but are not limited to, all servers that host websites, proprietary servers, and DNS servers.

Computer 18 can be one of a number of computers accessible via a private or public network such as the Internet. Each such computer 18 can be used for one or more purposes, such as a web server accessible by the vehicle via CCM 24 and wireless carrier 14. Other such accessible computers 18 can be, for example: a service center computer where diagnostic information and other vehicle data can be uploaded from the vehicle via the CCM 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 64, servers 66, databases 68, live advisors 70, as well as an automated voice response system (VRS) 72, all of which are known in the art. These various call center components are preferably coupled to one another via a wired or wireless local area network 74. Switch 64, which can be a private branch exchange (PBX) switch, routes incoming signals so that voice transmissions are usually sent to either the live adviser 70 by regular phone or to the automated voice response system 72 using VoIP. The live advisor phone can also use VoIP as indicated by the broken line in FIG. 1. VoIP and other data communication through the switch 64 is implemented via a modem (not shown) connected between the switch 64 and network 74. Data transmissions are passed via the modem to server 66 and/or database 68. Database 68 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 70, it will be appreciated that the call center can instead utilize VRS 72 as an automated advisor or, a combination of VRS 72 and the live advisor 70 can be used.

FIGS. 2A and 2B illustrate an exemplary embodiment of CCM 24. CCM 24 is a modular communications unit having a host portion 80 with one or more slot(s) 86 configured to receive a removable communications cartridge 82. In one embodiment, a front face of a housing 84 of the CCM 24 includes one or more Internet interface access ports 88 such as, for example, Ethernet; external antenna ports 90; a power supply connector 92; a communications bus input 94 such as, for example, vehicle bus 38; and call buttons 28, which in one embodiment include buttons for initiating emergency services and contacting live advisor 70. In one embodiment, the one or more slot(s) 86 of the host 80 are located on the front face of the CCM housing 84. Within the slot(s) 86 is an interface 87 having a wiring and pin arrangement configured in a mating arrangement with respect to an interface 83 of the removable communications cartridge 82. In one embodiment, interface 83 includes one or more connectors, including, but not limited to, antenna connectors 100 and a baseband bus connector 102. It should be appreciated that the interface 87 may also be located on the front face 84 of the housing 84.

In one embodiment, the communications cartridge 82 slideably engages with the slot 86 when the communications cartridge 82 is inserted therewith. While communications cartridge 82 is shown in FIGS. 2A and 2B having an elongated oval housing configured to be received by an elongated oval insert slot 86, one of ordinary skill in the art appreciates that both the cartridge 82 and insertion slot 86 can also be rectangular, as further shown in FIG. 2B, or any other shape as long as there is a mating arrangement between cartridge 82 and insertion slot 86.

Figure 3:
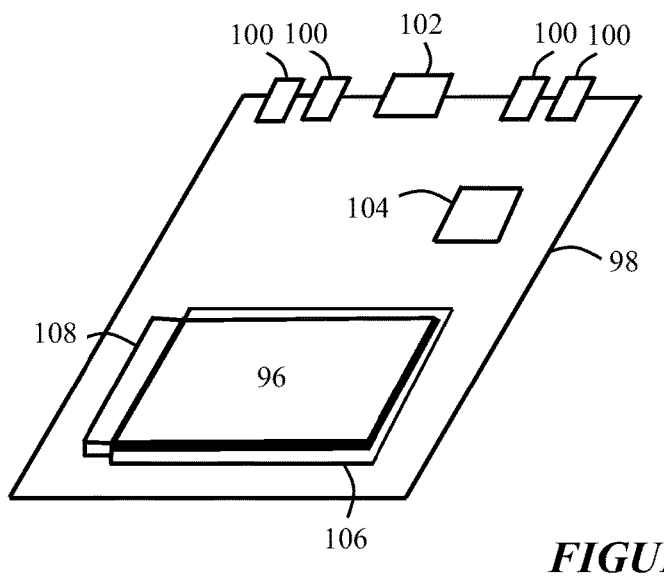
FIG. 3 illustrates an internal view of the hardware associated with the configurable communications module shown in FIG. 2.

FIG. 3 illustrates an internal view of an exemplary removable communications cartridge 82 having a communications or network card 96, such as, for example, a modem. For ease of explanation, a modem will be used to explain the various features relating to host 80 and removable communications cartridge 82, however, one of ordinary skill in the art understands that any communication or network card may be used that is removable and replaceable in a plug-and-play manner. The communications cartridge 82 further includes an adapter board 98 having antenna connectors 100, baseband bus connector 102, memory 104, and a cradle 106 configured to receive the modem or any other network access or communication card 96. The cradle 106 is compatible with any off-the-shelf card, which enables the CCM 24 to be upgradeable as technology advances. The cradle 106 includes an interface 108 for communicatively coupling the communications card 96 to the adapter board 98. In one embodiment, the interface 108 is a connector having a wiring and pin arrangement configured to extract select configuration information from the communications card 96 for stabilizing communication between the communications card 96 and the host 80. In addition, the adapter board is configured with circuitry designed to provide a connection between communications card 96 and the antenna connectors 100, baseband bus connector 102, and memory 104.

Through antenna connectors 100 and baseband bus connector 102, the communications card 96 is communicatively coupled to the host 80.

In one embodiment, the adaptor board 98 provides a standard interface between the host 80 and any communication card or modem 96 placed into cradle 106. Specifically, the adaptor board 98 contains wiring and pin arrangements that provide an interface that adapts the modem's 96 hardware configuration to that of the host's hardware. For instance, in one embodiment, the pin arrangement in connector 108 in cradle 106 is configured to extract from the modem 96 only the signals needed by host 80. In one example, those signals are the modem's 96 radio frequency signals and baseband signals, which are routed through the circuitry in the adaptor board 98 to the antenna connector(s) 100 and the baseband bus connector 102, respectively. In this way, production costs are reduced by limiting the number of connections. In addition, for automotive applications, the antenna connector(s) 100 and the baseband bus connector 102 are rated to withstand the harsh automotive environment, whereas off-the-shelf cards and modems are not so equipped.

Through the communicative coupling between the host 80 and the communications card through the adapter board 98, the host 80 is able to detect the presence and type of communication card 96 in the communications cartridge 82. In one embodiment, the host 80 is configured to access configuration information relating to the communications card 96 from a memory 104 in the at least one communications cartridge. The configuration information may include at least one of, or a combination of: software, hardware, firmware, or drivers for operating the communications card 96. In one example, the host 80 is configured to request and install drivers associated with the communications card 96.

The memory 104 on the adapter board 98 may include volatile and non-volatile memory and stores various drivers for accessing the modem. The drivers are configured to translate connection procedures for the host 80 of CCM 24 into the modem's standard and non-standard modem commands. The drivers may also be used to update the software contained in the host 80 of CCM 24.

In another embodiment not shown in the Figures, host 80 includes multiple insertion slots 86 adapted to receive general purpose communications cartridges 82 that house any type of communications card 96. In this way, CCM 24 through host 80 is able to expand its capabilities to upgrade a plurality of communications cards 96 at the same time.

Figure 4:
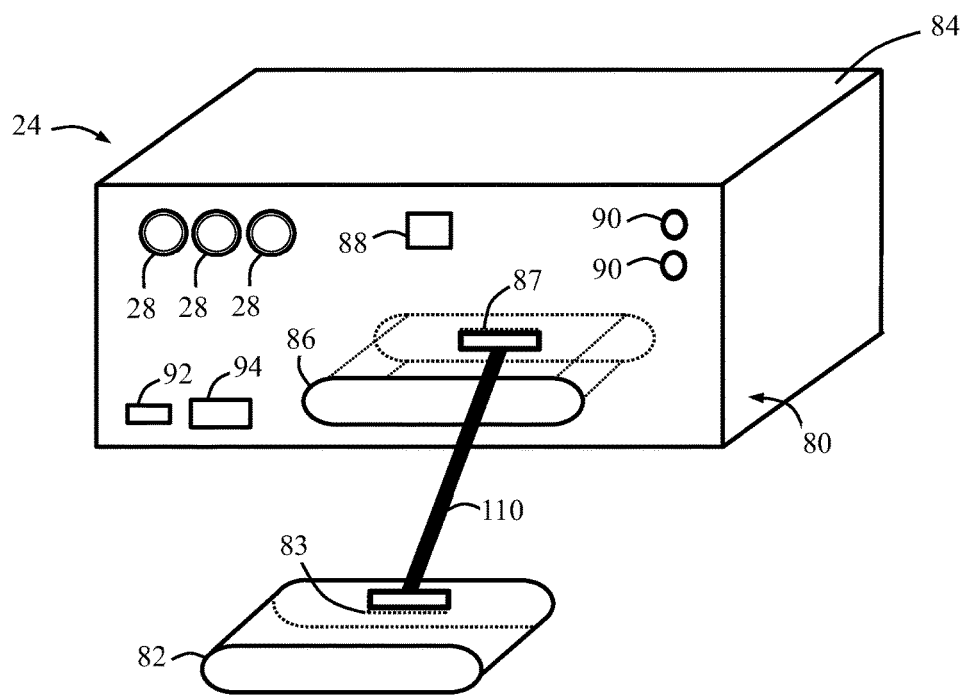
FIG. 4 illustrates another exemplary embodiment of a configurable communications module according to one embodiment of the present invention.

In yet another embodiment shown in FIG. 4, in lieu of connecting the host to the communications cartridges 82 through insertion into the insertion slot 86 in the host 80, the communications cartridge 82 communicates to the host 80 through an extension cable 108. The extension cable 110 extends from the communications cartridge 82 to the host 80 via a connector that includes data and RF connection points. In this way, the communications cartridge 82 may be stored remotely from the host 80 in an area that may be accessible to a user.

Method—

Figure 5:
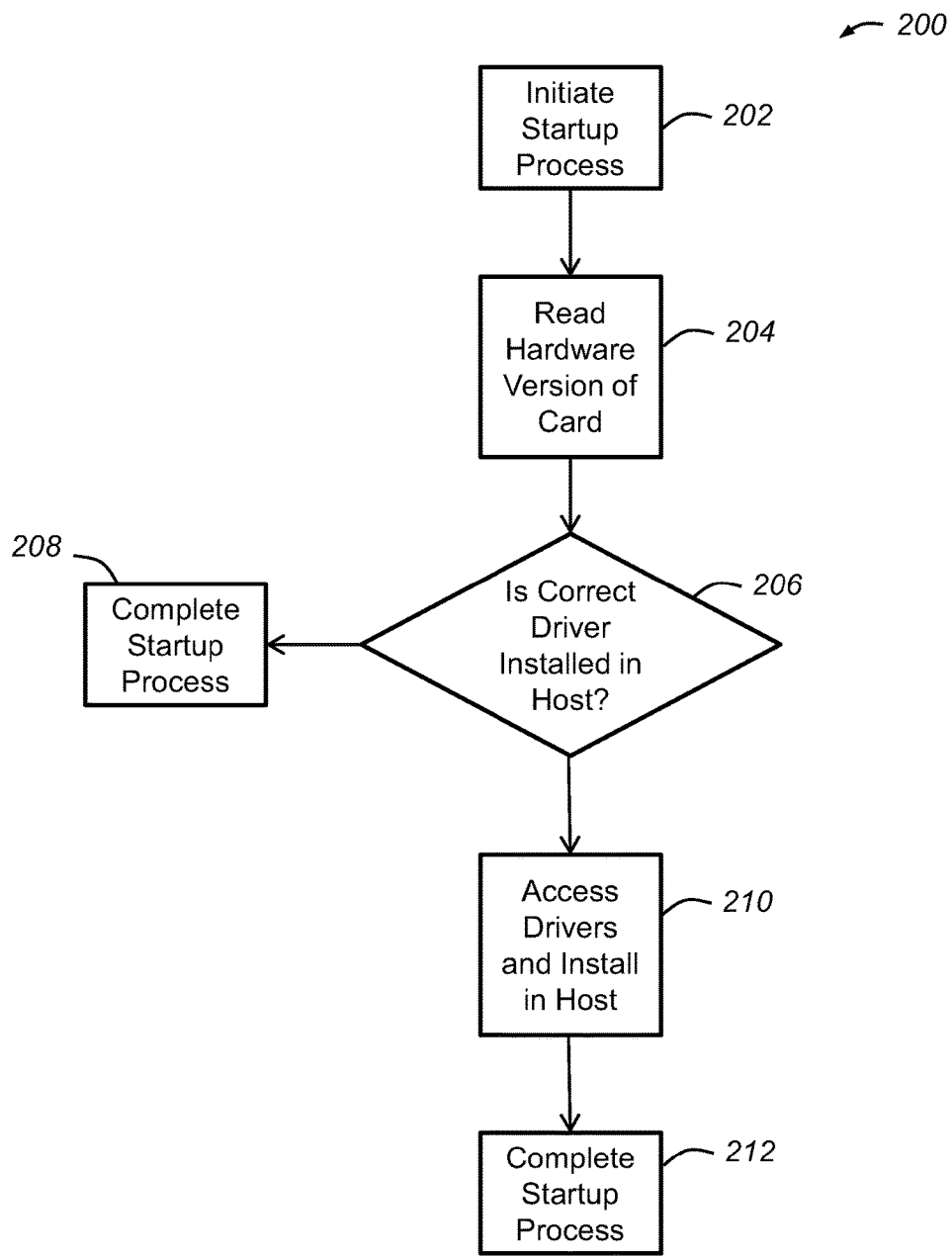
FIG. 5 illustrates a flow chart of a method for implementing a communications card update.

Turning now to FIG. 5, there is a method 200 for implementing a communication card update. At step 202, the CCM 24 is powered up. In an automotive application, this may be when the vehicle is started. At step 204 the host 80 processor 48 reads the hardware and/or software version of the communications card in slot 106. At step 106, the processor 48 determines whether the driver for the communications card 96 in slot 106 is currently installed in the host 80. If the correct driver is installed, at step 108 the CCM 24 completes the startup process. If however, the correct driver is not installed, the host 80 processor obtains the necessary drivers from the memory 104 on adapter board 98. Alternatively, the host 80 processor 48 may directly access the necessary drivers from a processor associated with the communications card in slot 92. Once the drivers have been installed to the host 80, the CCM 24 completes its startup.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A system for providing wireless communication and telematics in a vehicle, the system comprising:
a communications module configured to provide wireless communications using a cellular communications protocol, a short-range wireless communications protocol, or both, the communications module includes a host portion in communication with at least one communications cartridge, wherein the at least one communications cartridge includes an adapter board having a cradle for receiving a wireless communications card, wherein the cradle includes an interface for removably coupling the wireless communications card to the adapter board, and wherein the adapter board is configured to communicatively couple the wireless communications card and the host portion of the communications module such that the wireless communications card is used to carry out the wireless communications that use the cellular communications protocol, the short-range wireless communications protocol, or both;
wherein the communications module is included in the vehicle.

2. The system of claim 1, wherein the wireless communications card is communicatively coupled to the host portion of the communications module through one or more connectors on the adapter board.

3. The system of claim 2, wherein the one or more connectors include antenna and baseband bus connectors.

4. The system of claim 1, wherein the host portion of the communications module is configured to detect the type of wireless communications card in the at least one communications cartridge.

5. The system of claim 1, wherein the cradle interface is configured to extract configuration information from the communications card for establishing communication between the wireless communications card and the host portion of the communications module.

6. The system of claim 1, wherein the host portion is configured to access configuration information relating to the wireless communications card from a memory in the at least one communications cartridge.

7. The system of claim 6, wherein the configuration information includes one or a combination of: software, firmware, or drivers for operating the wireless communications card.

8. The system of claim 1, wherein the host portion includes a slot configured to slidably receive the at least one communications cartridge, and wherein the at least one communications cartridge is communicatively coupled to the host portion through an interface in the slot of the host portion that has a mating arrangement with an interface on the at least one communications cartridge.

9. The system of claim 1, wherein the host portion of the communications module is communicatively coupled to the at least one communications cartridge through a cable that extends from the at least one communications cartridge to the host portion of the communications module.

10. The system of claim 1, wherein the host portion of the communications module includes a plurality of slots configured to receive a plurality of communications cartridges.

11. The communications device of claim 1, wherein the host portion of the communications module is configured to detect a hardware version of the wireless communications card.

12. The communications device of claim 1, wherein the host portion of the communications module is configured to request and install drivers associated with the wireless communications card.

13. The communications device of claim 1, wherein the wireless communications card is a modem.

14. A system for providing wireless communication and telematics in a vehicle, the system comprising:
  a modular communications unit configured to provide wireless communications using a cellular communications protocol, a short-range wireless communications protocol, or both, the modular communications unit includes a host portion in communication with at least one communications cartridge having a removable wireless communications card, wherein the host portion is communicatively coupled to the wireless communications card through the at least one communications cartridge and wherein the host portion is configured to detect information relating to the removable wireless communications card and to access configuration information relating to the removable wireless communications card from the at least one communications cartridge;
  wherein the removable wireless communications card is used to carry out the wireless communications that use the cellular communications protocol, the short-range wireless communications protocol, or both; and
  wherein the modular communications unit is included in the vehicle.

15. The system of claim 14, wherein at least one communications cartridge includes an adapter board having a cradle for receiving the removable wireless communications card, and wherein the cradle includes an interface for coupling the removable wireless communications card to the adapter board, and wherein the adapter board is configured to communicatively couple the wireless communications card and the host portion of the modular communications unit.

16. The system of claim 15, wherein the cradle interface is configured to extract configuration information from the wireless communications card for establishing communication between the wireless communications card and the host portion of the modular communications unit.

17. The system of claim 14, wherein the host portion of the modular communications unit is configured to detect the type of wireless communications card in the at least one communications cartridge.

18. The system of claim 14, wherein the host portion of the modular communications unit is configured to obtain from the at least one communications cartridge at least one of or a combination of: software, firmware, or drivers for operating the wireless communications card.

19. The system of claim 14, wherein the host portion of the modular communications unit is communicatively coupled to a plurality of communications cartridges.

20. The system of claim 14, wherein the wireless communications card is a modem.

* * * * *